US011842505B2

(12) United States Patent
Jinno

(10) Patent No.: US 11,842,505 B2
(45) Date of Patent: Dec. 12, 2023

(54) APPARATUS, METHOD, AND STORAGE MEDIUM

(71) Applicant: CANON KABUSHIKI KAISHA, Tokyo (JP)

(72) Inventor: Takayuki Jinno, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 193 days.

(21) Appl. No.: 17/481,028

(22) Filed: Sep. 21, 2021

(65) Prior Publication Data
US 2022/0101545 A1 Mar. 31, 2022

(30) Foreign Application Priority Data
Sep. 25, 2020 (JP) ................. 2020-161332

(51) Int. Cl.
*G06K 9/00* (2022.01)
*G06T 7/49* (2017.01)
*G06V 10/42* (2022.01)
*G06V 10/60* (2022.01)

(52) U.S. Cl.
CPC ............... *G06T 7/49* (2017.01); *G06V 10/42* (2022.01); *G06V 10/60* (2022.01)

(58) Field of Classification Search
CPC ....... G06T 7/49; G06T 15/20; G06T 2200/24; G06T 15/506; G06V 10/42; G06V 10/60; G06F 3/0482; G06F 3/04845; G06F 3/04847; H04N 5/262; H04N 23/62; H04N 23/66; H04N 23/80
See application file for complete search history.

(56) References Cited

U.S. PATENT DOCUMENTS

| | | | |
|---|---|---|---|
| 9,400,916 B1* | 7/2016 | Brownlee | A61B 5/0059 |
| 11,403,811 B1* | 8/2022 | Upchurch | G06N 3/084 |
| 2005/0168465 A1* | 8/2005 | Tatsumi | G06T 15/506 |
| | | | 345/426 |
| 2011/0164805 A1* | 7/2011 | Blair | G06V 10/143 |
| | | | 382/137 |
| 2012/0248314 A1* | 10/2012 | Karam | G01S 13/887 |
| | | | 250/341.8 |
| 2013/0044128 A1* | 2/2013 | Liu | G02B 27/017 |
| | | | 345/633 |
| 2016/0093091 A1* | 3/2016 | Itoh | G06T 15/506 |
| | | | 345/426 |
| 2018/0144547 A1* | 5/2018 | Shakib | G06T 15/503 |

(Continued)

FOREIGN PATENT DOCUMENTS

JP 2005122719 A 5/2005

*Primary Examiner* — Shervin K Nakhjavan
(74) *Attorney, Agent, or Firm* — CANON U.S.A., INC. IP Division

(57) ABSTRACT

An apparatus includes an acquisition unit configured to acquire target data, a determination unit configured to determine whether the target data has material appearance information of an object, and a control unit configured to display, on a display unit, an image corresponding to the target data based on a result of the determination by the determination unit, wherein, in a case where the target data has the material appearance information of the object, the control unit displays a moving image or consecutive still images, which includes a plurality of images under different viewing conditions, corresponding to the target data.

19 Claims, 7 Drawing Sheets

(56) References Cited

U.S. PATENT DOCUMENTS

| | | | |
|---|---|---|---|
| 2019/0130560 A1* | 5/2019 | Horowitz | G06F 18/41 |
| 2020/0027106 A1* | 1/2020 | Kendrick | G06N 3/08 |
| 2020/0109990 A1* | 4/2020 | Campbell | G01J 3/0254 |
| 2020/0233400 A1* | 7/2020 | Wright | G05B 19/40932 |
| 2020/0342652 A1* | 10/2020 | Rowell | G06V 10/82 |
| 2021/0323696 A1* | 10/2021 | Zhang | B62B 3/16 |
| 2022/0101545 A1* | 3/2022 | Jinno | G06T 7/49 |
| 2022/0114803 A1* | 4/2022 | Wang | G06V 10/70 |
| 2022/0327769 A1* | 10/2022 | Tsai | G06T 15/205 |
| 2023/0119387 A1* | 4/2023 | Kropf | G06T 19/00 345/419 |

\* cited by examiner

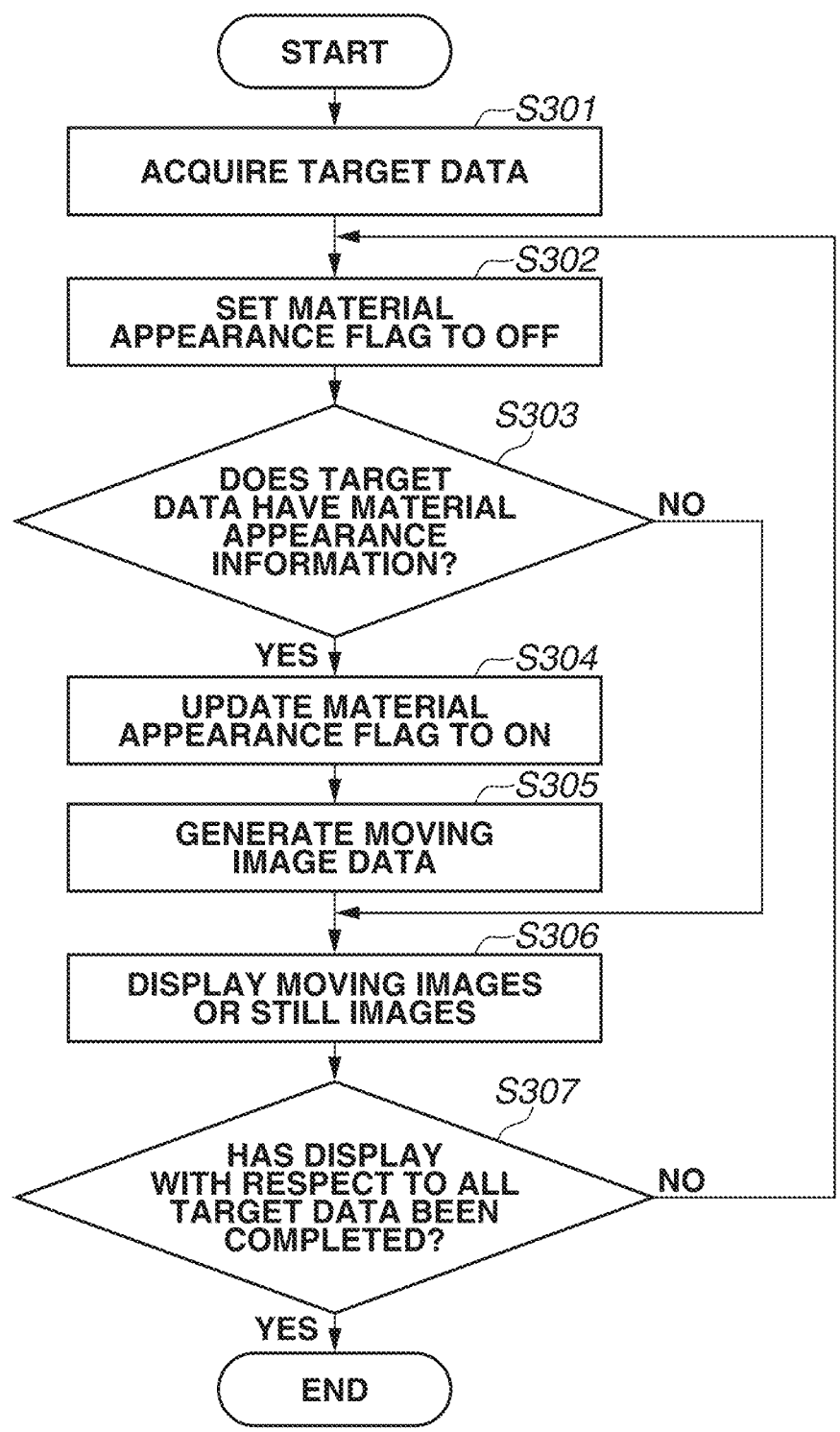

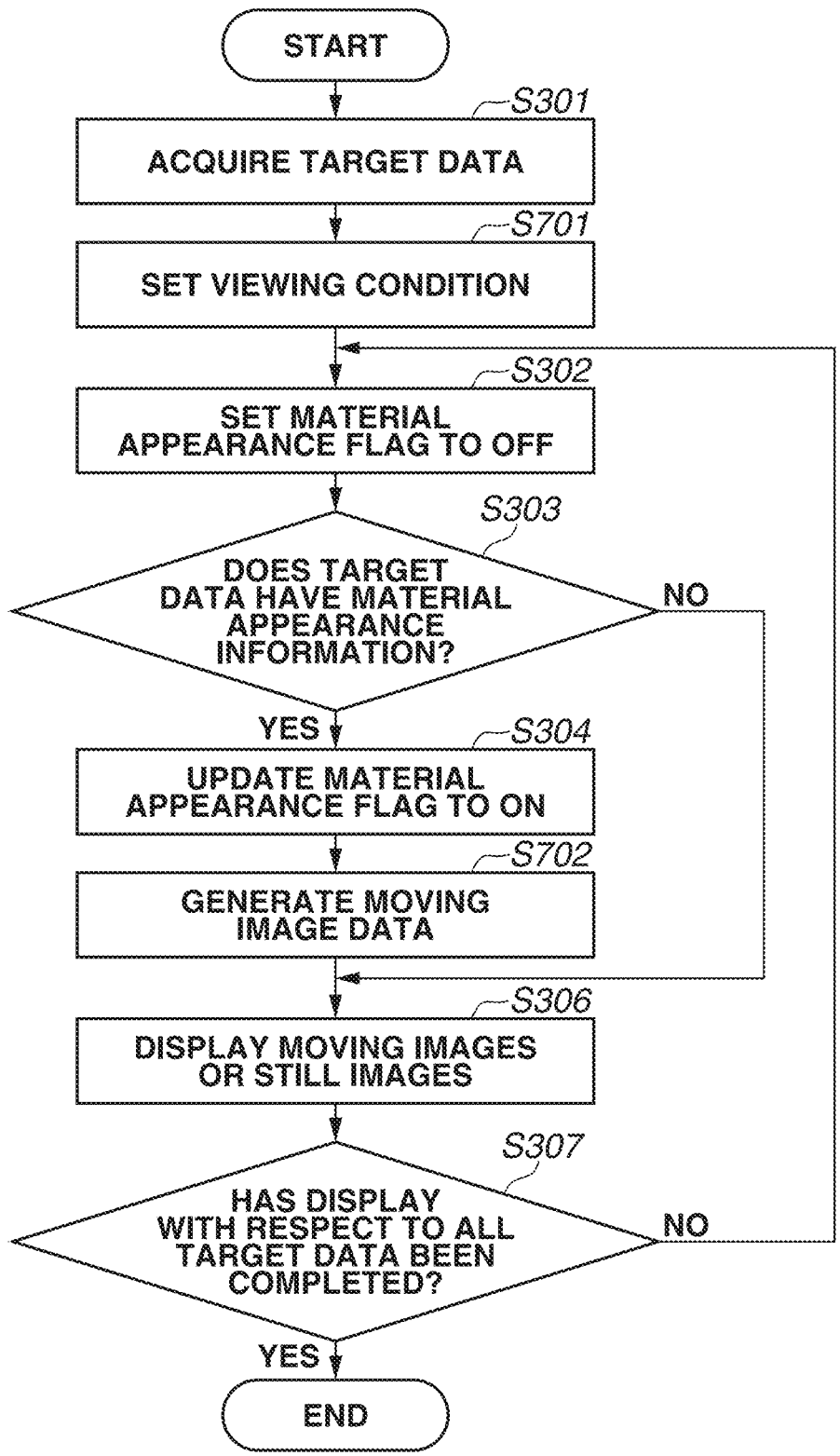

APPARATUS, METHOD, AND STORAGE MEDIUM

BACKGROUND OF THE DISCLOSURE

Field of the Disclosure

The aspect of the embodiments relates to an image processing technique for representing a material appearance of an object.

Description of the Related Art

With the widespread use of the Internet, there has been a growing demand for representing not only a color and a shape of a product but also a material appearance of the product on a screen of a personal computer (PC), a screen of a tablet terminal, or a screen of a smartphone. Various kinds of three-dimensional computer graphics (3DCG) methods have been used to represent a material appearance of an object, coating, or the like. Japanese Patent Application Laid-Open No. 2005-122719 discusses a technique of generating a two-dimensional image representing a material appearance of an object according to a position of a light source, a position of an object, or a position of a viewpoint.

However, in a case where the material appearance of the object is desired to be checked under a plurality of viewing conditions, the technique according to Japanese Patent Application Laid-Open No. 2005-122719 requires a user to input light source information, viewpoint information, and the like every time the user changes a viewing condition.

SUMMARY OF THE DISCLOSURE

According to an aspect of the embodiments, an apparatus includes an acquisition unit configured to acquire target data, a determination unit configured to determine whether the target data has material appearance information of an object, and a control unit configured to display, on a display unit, an image corresponding to the target data based on a result of the determination by the determination unit, wherein, in a case where the target data has the material appearance information of the object, the control unit displays a moving image or consecutive still images, which includes a plurality of images under different viewing conditions, corresponding to the target data.

Further features of the disclosures will become apparent from the following description of exemplary embodiments with reference to the attached drawings.

BRIEF DESCRIPTION OF THE DRAWINGS

FIG. 3 is a flowchart illustrating processing executed by the image processing apparatus.

FIG. 7 is a flowchart illustrating processing executed by the image processing apparatus.

DESCRIPTION OF THE EMBODIMENTS

Exemplary embodiments according to the disclosure will be described below with reference to the accompanying drawings. The following exemplary embodiments do not necessarily limit the disclosure. Not all of combinations of features described in the exemplary embodiments are necessarily essential for solving the issues of the disclosure.

<Hardware Configuration of Image Processing Apparatus>

Figure 1:
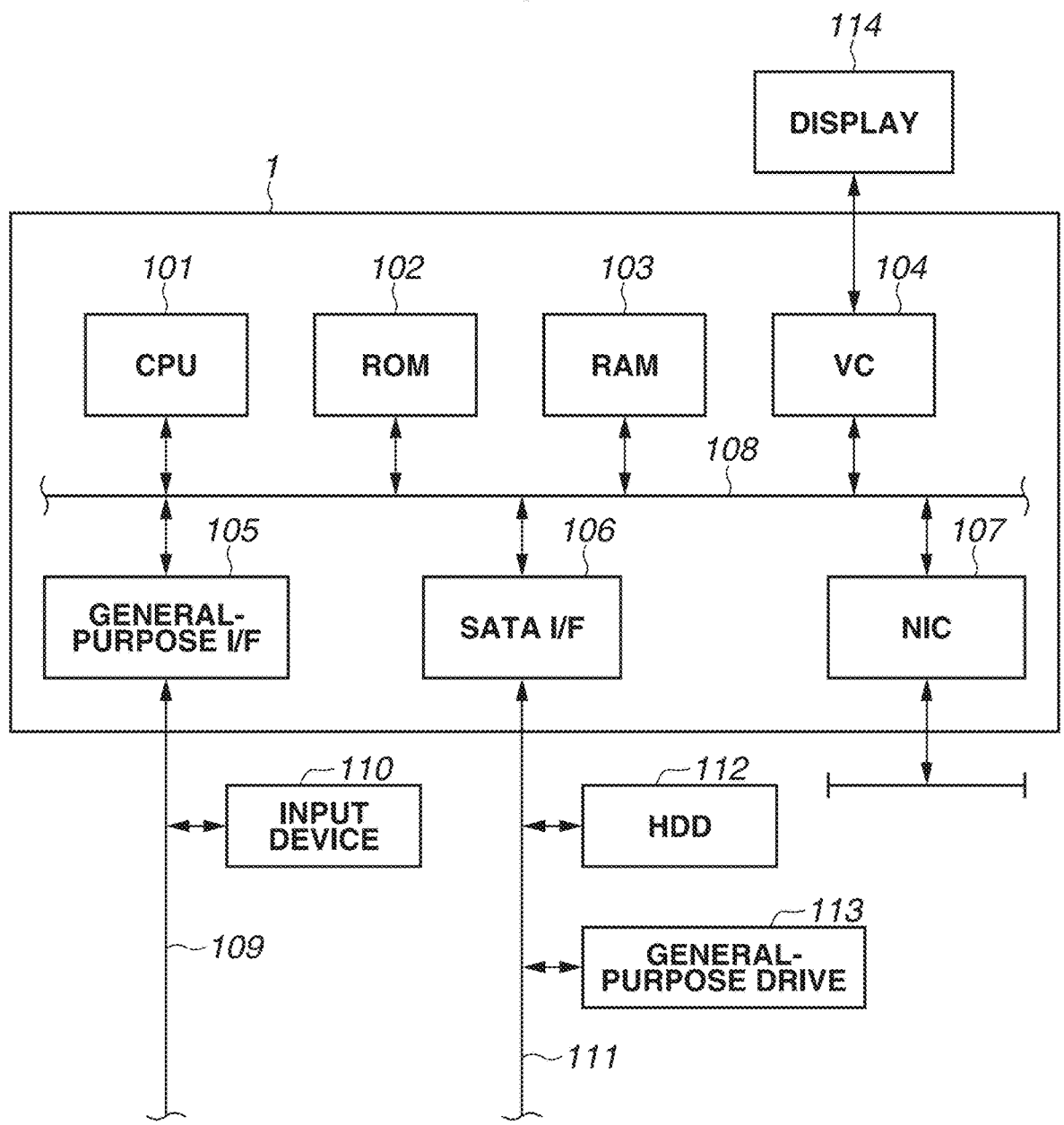
FIG. 1 is a block diagram illustrating a hardware configuration of an image processing apparatus.

FIG. 1 is a block diagram illustrating a hardware configuration of an image processing apparatus 1 according to a first exemplary embodiment. The image processing apparatus 1 includes a central processing unit (CPU) 101, a read-only memory (ROM) 102, and a random-access memory (RAM) 103. The image processing apparatus 1 further includes a video card (VC) 104, a general-purpose interface (I/F) 105, a Serial Advanced Technology Attachment (SATA) I/F 106, and a network interface card (NIC) 107. The CPU 101 executes an operating system (OS) and various kinds of programs stored in the ROM 102, a hard disk drive (HDD) 112, or the like using the RAM 103 as a work memory. The CPU 101 controls each constituent element via a system bus 108. Processing in the flowcharts described below is implemented by the CPU 101 loading program codes stored in the ROM 102, the HDD 112, or the like to the RAM 103 and executing the program codes. A display 114 is connected to the VC 104. An input device 110, such as a mouse and a keyboard, is connected to the general-purpose I/F 105 via the serial bus 109. A general-purpose drive 113 that performs reading and writing from/to the HDD 112 or a recording medium of various kinds is connected to the SATA I/F 106 via a serial bus 111. The NIC 107 inputs and outputs information to/from an external apparatus. The CPU 101 uses the recording medium of various kinds mounted on the HDD 112 or the general-purpose drive 113 as a storage location for various kinds of data. The CPU 101 displays a graphical user interface (GUI) provided by a program on the display 114, and receives an input such as a user instruction accepted via the input device 110.

<Functional Configuration of Image Processing Apparatus>

Figure 2:
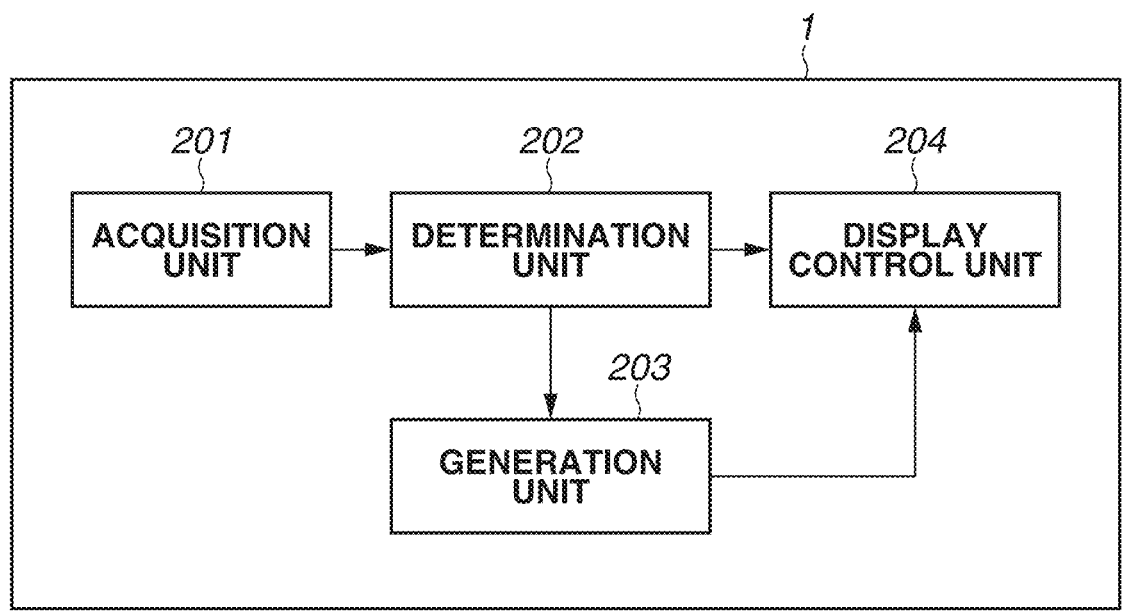
FIG. 2 is a block diagram illustrating a functional configuration of the image processing apparatus.

FIG. 2 is a block diagram illustrating a functional configuration of the image processing apparatus 1. The CPU 101 reads out and executes a program stored in the ROM 102 or the HDD 112 using the RAM 103 as a work memory, thereby functioning as the functional configuration illustrated in FIG. 2. Not all of the processing described below is necessarily executed by the CPU 101. The image processing apparatus 1 can have a configuration in which one or more processing circuits other than the CPU 101 execute a part or all of the processing.

The image processing apparatus 1 includes an acquisition unit 201, a determination unit 202, a generation unit 203, and a display control unit 204. The acquisition unit 201 acquires data having material appearance information of an object or two dimensional still image data as target data. The data including the material appearance information in the present exemplary embodiment is data in a three-dimensional (3D) model format, and described in a Wavefront object (OBJ) format. When performing rendering using data in the Wavefront OBJ format, the image processing apparatus 1 refers to a file in a Material Template Library (MTL) format that is a 3D texture format. The two-dimensional still image data is image data in a Joint Photographic Experts Group (JPEG) format.

The determination unit 202 determines whether the target data acquired by the acquisition unit 201 is data having the material appearance information of the object. The generation unit 203 generates moving image data in a Motion Picture Experts Group (MPEG) 4 format or the like including a plurality of frames under different viewing conditions with respect to the target data determined by the determination unit 202 as having the material appearance information of the object. The display control unit 204 displays (automatically reproduces) the moving image data including the plurality of frames under the different viewing conditions and generated by the generation unit 203 with respect to the target data determined by the determination unit 202 to be the data having the material appearance information. The display control unit 204 displays, as a two-dimensional still image, the target data determined by the determination unit 202 to be not the data having the material appearance information.

<Flow of Processing Executed by Image Processing Apparatus>

Processing executed by the image processing apparatus 1 will be described in detail below with reference to FIG. 3. The processing illustrated in the flowchart in FIG. 3 starts by a user inputting an instruction via the input device 110 and the CPU 101 accepting the input instruction. In the following description, each step (process) is represented by attaching S before a corresponding reference number. In step S301, the acquisition unit 201 acquires target data. The acquisition unit 201 in the present exemplary embodiment acquires four types of target data from a storage apparatus such as the HDD 112 according to the input instruction from the user.

In step S302, the acquisition unit 201 sets a material appearance flag (flg), which is a one-bit signal, to OFF (flg=0) with respect to the target data. The material appearance flag is given to each target data acquired by the acquisition unit 201. In step S303, the determination unit 202 determines whether the target data acquired in step S301 is data having material appearance information. In a case where the determination unit 202 determines that the target data is data having the material appearance information (YES in step S303), the processing proceeds to step S304. In step S304, the determination unit 202 sets (updates) the material appearance flag corresponding to the determined target data to ON (flg=1).

In step S305, the generation unit 203 generates moving image data including a plurality of frames under different viewing conditions with respect to the target data where the material appearance flag has been set to ON. A known method, such as bump mapping, ray tracing, or photon mapping, can be used to generate the moving image data. In a case where the determination unit 202 determines that the target data is not data having the material appearance information (NO in step S303), the processing skips steps S304 and S305.

In step S306, the display control unit 204 displays a moving image represented by the moving image data or a still image represented by still image data, based on the material appearance flag corresponding to the target data. In a case where the material appearance flag of the target data is set to ON (flg=1), the display control unit 204 displays the moving image represented by the moving image data generated in step S305 on the display 114. In a case where the material appearance flag of the target data is set to OFF (flg=0), the display control unit 204 displays a two-dimensional still image represented by the still image data acquired in step S301 as it is on the display 114. In step S307, the display control unit 204 determines whether display with respect to all of the acquired target data has been completed. In a case where the display with respect to all of the acquired target data has not been completed (NO in step S307), the processing in step S302 and subsequent steps is executed with respect to the next target data. In a case where the display with respect to all of the acquired target data has been completed (YES in step S307), the processing ends.

<Display by Display Control Unit>

Figure 4A:
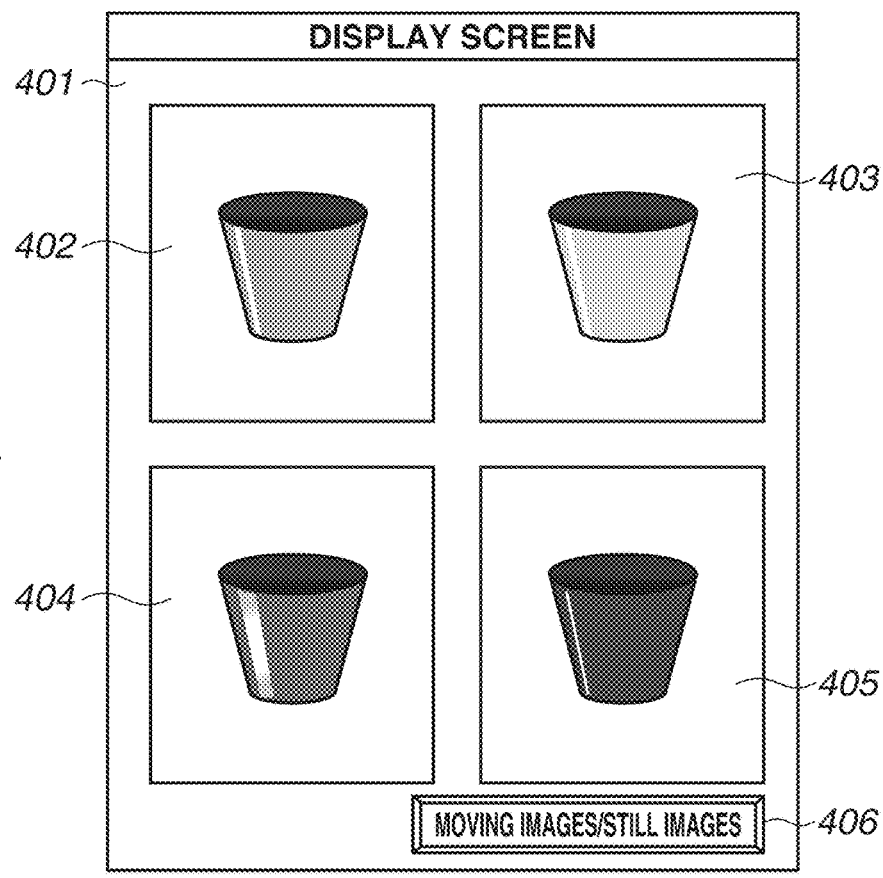
FIGS. 4A and 4B are diagrams each illustrating an example of a user interface.
Figure 4B:
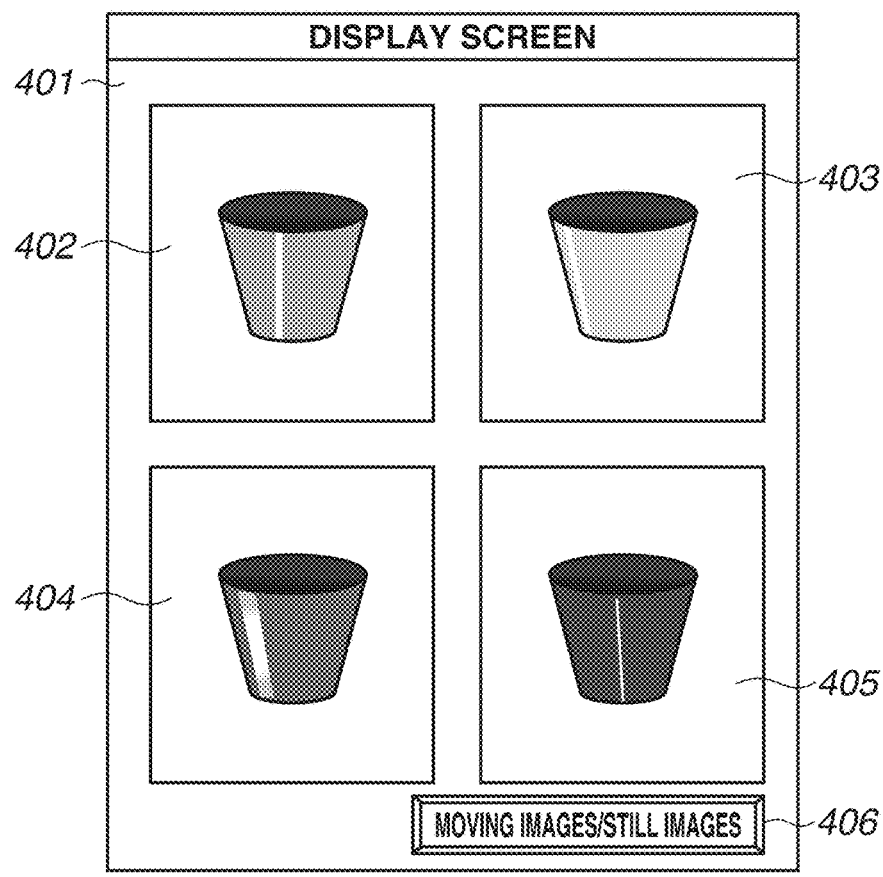

Processing executed by the display control unit 204 will be described in detail with reference to FIGS. 4A and 4B. FIGS. 4A and 4B are diagrams each illustrating an example of a user interface (UI) displayed on the display 114. A window 401 is a display area for displaying an image. Display images 402 to 405 are images displayed with respect to the four types of target data acquired in step S301. In the example illustrated in FIGS. 4A and 4B, four types of objects that are different in color and material appearance are displayed, and a highlight area on a surface of each object indicates that lighting is reflected on the surface of the object. FIG. 4A illustrates results of display at a time A. FIG. 4B illustrates results of display at a time B that is different from the time A. The display images 402 and 405 are results of display corresponding to the target data determined as having the material appearance information in step S303, and are moving images including a plurality of frames under different viewing conditions. The display images 403 and 404 are results of display corresponding to the target data determined as not having the material appearance information in step S303, and are two-dimensional still images. By making a comparison of the display images 402 and 405 between FIGS. 4A and 4B, a position of the highlight area on the surface of the corresponding object is changed according to a display time. This is because a result of rendering performed by changing a viewing condition (a lighting direction) is displayed according to the display time.

The display control unit 204 synchronizes a reproduction start frame and a frame rate among moving images to be displayed, and displays the moving images under an identical viewing condition. This enables a comparison of colors and material appearances between different objects under a plurality of viewing conditions. A button 406 is for switching between moving images and still images. When accepting the pressing of the button 406, the display control unit 204 switches between reproduction and stop of the reproduction of the displayed moving images.

Effects

As described above, the image processing apparatus 1 according to the first exemplary embodiment acquires the target data, and determines whether the target data has the material appearance information of the object. The image processing apparatus 1 displays an image corresponding to the target data, based on a result of the determination. In a case where the target data has the material appearance information of the object, the image processing apparatus 1 displays the moving images including the plurality of images under the different viewing conditions and corresponding to the target data. This configuration enables presentation of the material appearance of the object under the plurality of viewing conditions without the need for the user to input information to change the viewing conditions.

<Modification>

While the lighting direction is changed as the viewing condition in the present exemplary embodiment, any one of conditions regarding a distance between lighting and the object, an orientation of the object, a viewing direction, and a viewing distance can be changed as far as the condition is a parameter that can be changed in computer graphics (CG) rendering. In addition, a plurality of conditions can be changed in a combined manner.

In the first exemplary embodiment, the image processing apparatus 1 generates and automatically reproduces the moving images including the plurality of frames under the different viewing conditions with respect to the data having the material appearance information. In a second exemplary embodiment, the image processing apparatus 1 sets viewing conditions with respect to data having material appearance information, and reproduces moving images based on the set viewing conditions. Since a hardware configuration of the image processing apparatus 1 according to the second exemplary embodiment is similar to that of the first exemplary embodiment, a description thereof is omitted. A description will be given mainly of a part different between the present exemplary embodiment and the first exemplary embodiment. The same constituent element as that of the first exemplary embodiment is denoted by the same reference numerals, and a description thereof is omitted.

<Functional Configuration of Image Processing Apparatus>

Figure 5:
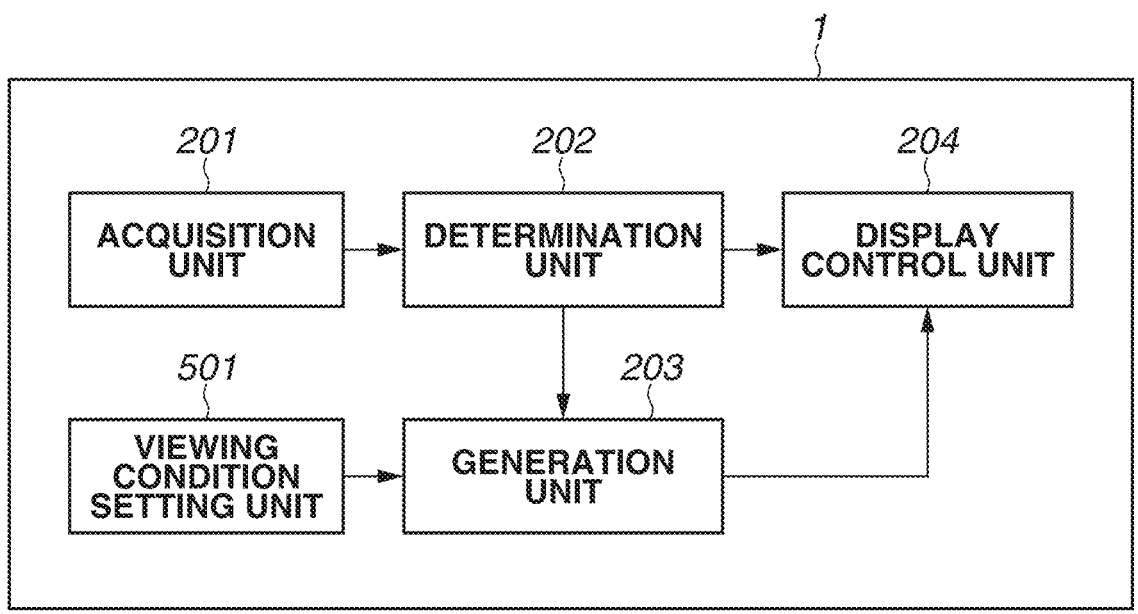
FIG. 5 is a block diagram illustrating a functional configuration of the image processing apparatus.

FIG. 5 is a block diagram illustrating a functional configuration of the image processing apparatus 1. The image processing apparatus 1 includes the acquisition unit 201, a viewing condition setting unit 501, the determination unit 202, the generation unit 203, and the display control unit 204. The viewing condition setting unit 501 sets a way of changing a viewing condition. The processing of the viewing condition setting unit 501 will be described in detail below with reference to FIG. 6.

Figure 6:
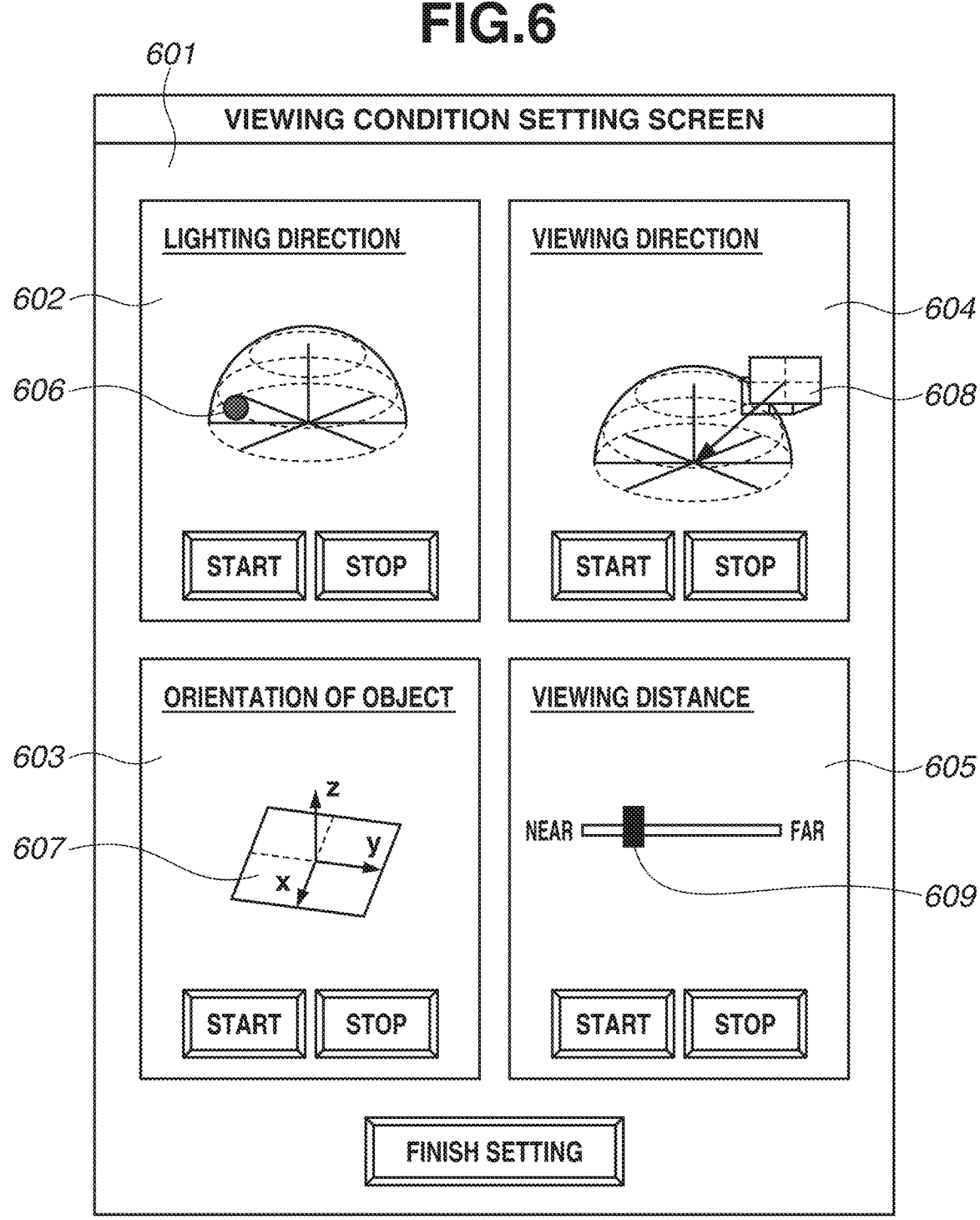
FIG. 6 is a diagram illustrating an example of a user interface.

FIG. 6 is a diagram illustrating an example of a UI displayed so that viewing conditions can be set. A window 601 is a setting area for setting the viewing conditions. An area 602 is for setting the lighting direction, and an area 603 is for setting the orientation of the object. An area 604 is for setting the viewing direction, and an area 605 is for setting the viewing distance.

In a case of setting a way of changing the lighting direction in the area 602, the user presses a start button in the area 602, performs a drag operation using a mouse, a finger, or the like to continuously move a light source 606 in a freely-selected direction, and thereafter presses a stop button in the area 602. In a case of setting a way of changing the orientation of the object in the area 603, the user presses a start button in the area 603, performs a drag operation using the mouse, the finger, or the like to continuously rotate a coordinate axis 607 of the object in a freely-selected direction, and thereafter presses a stop button in the area 603. In a case of setting a way of changing the viewing direction in the area 604, the user presses a start button in the area 604, performs a drag operation using the mouse, the finger, or the like to continuously move a camera 608, which indicates a viewing position, in a freely-selected direction, and thereafter presses a stop button in the area 604. In a case of setting a way of changing the viewing distance in the area 605, the user presses a start button in the area 605, performs a drag operation using the mouse, the finger, or the like to change a position of a slider 609, which indicates a viewing distance, in a freely-selected position, and thereafter presses a stop button in the area 605.

In response to the pressing of the start button and the pressing of the stop button, the viewing condition setting unit 501 stores respective changes of the viewing conditions instructed by the user during the period along a time axis. When a finish setting button on the window 601 is pressed, the viewing condition setting unit 501 finishes the setting of the viewing conditions. One or more viewing conditions can be set. An initial value is applied as it is to an item that has not been changed.

<Flow of Processing Executed by Image Processing Apparatus>

Processing executed by the image processing apparatus 1 will be described in detail below with reference to FIG. 7. The processing illustrated in the flowchart in FIG. 7 starts by the user inputting an instruction via the input device 110 and the CPU 101 accepting the input instruction. Since processing in steps S301 to S304, S306, and S307 is similar to the processing in the first exemplary embodiment, a description thereof is omitted.

In step S701, the viewing condition setting unit 501 sets a way of changing a viewing condition with respect to target data. The viewing condition setting unit 501 in the present exemplary embodiment sets a way of changing an identical viewing condition with respect to a plurality of pieces of target data. In step S702, the generation unit 203 generates moving image data including a plurality of frames under different viewing conditions, based on the set way of changing the viewing condition.

Effects

As described above, the image processing apparatus 1 according to the second exemplary embodiment sets the way of changing the viewing condition at the time of reproducing moving images, and generates moving image data based on the set way of changing the viewing condition. This enables a comparison of colors and material appearances between different objects under the plurality of viewing conditions in order as desired by the user.

<Modifications>

The way of changing the identical viewing condition with respect to the plurality of pieces of target data is set in the present exemplary embodiment. However, a way of changing a viewing condition can be set individually with respect to each target data. Alternatively, a way of changing a plurality of viewing conditions can be set with respect to one piece of target data. This enables simultaneous checking and comparison of colors and material appearances under a plurality of viewing conditions with respect to one object.

While the viewing condition is set after the acquisition of the target data in the present exemplary embodiment, the order of processing is not limited to the example described above. For example, the image processing apparatus 1 can set the viewing condition first and thereafter acquire the target data. Alternatively, the image processing apparatus 1 can acquire the target data and set the viewing condition simultaneously. Still alternatively, the image processing apparatus 1 can set the viewing condition after updating the material appearance flag.

In the exemplary embodiments described above, the image processing apparatus 1 generates and displays moving image data with respect to the target data having the material appearance information. However, the image processing apparatus 1 can generate and display consecutive still image data such as Graphics Interchange Format (GIF) animation, instead of the moving image data. In this case, a plurality of still images included in the consecutive still image data corresponds to respective different viewing conditions.

The data having the material appearance information in the exemplary embodiments described above is described in the Wavefront OBJ format, but can be described in another format, such as an Autodesk Filmbox (FBX) format.

In the exemplary embodiments described above, the generation unit 203 generates moving image data based on a result of determination by the determination unit 202. However, the image processing apparatus 1 can use consecutive still images on which CG rendering is preliminarily performed, or moving images or consecutive still images obtained by imaging an object while changing the viewing conditions. In this case, in step S301, the acquisition unit 201 acquires information indicating that the material appearance flag is ON together with the target data obtained by preliminarily performing CG rendering or imaging. The acquisition unit 201 acquires information indicating that the material appearance flag is OFF together with the still images. With this configuration, the image processing apparatus 1 can perform display using the display control unit 204 without performing processing of the determination unit 202 and processing of the generation unit 203.

The exemplary embodiments described above can be provided as a program that performs automatic description on a HyperText Markup Language (HTML) file. With generation of a file in an extensible 3D (X3D) format with respect to the data having the material appearance information, the data having the material appearance information can be referred to from the HTML file. With the generation of the HTML file, the data having the material appearance information can be put on the Internet and displayed in a browser.

The aspect of the embodiments enables presentation of a material appearance of an object under a plurality of viewing conditions without the need for a user to input information to change a viewing condition.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-161332, filed Sep. 25, 2020, which is hereby incorporated by reference herein in its entirety.

What is claimed is:

1. An apparatus, comprising:
one or more processors; and
at least one memory coupled to the one or more processors storing instructions that, when executed by the one or more processors, cause the one or more processors to function as:
an acquisition unit configured to acquire target data;
a determination unit configured to determine whether the target data has material appearance information of an object; and
a control unit configured to display, on a display unit, an image corresponding to the target data based on a result of the determination by the determination unit,
wherein, in a case where the target data has the material appearance information of the object, the control unit displays a moving image or consecutive still images, which includes a plurality of images under different viewing conditions, corresponding to the target data.

2. The apparatus according to claim 1, wherein the viewing conditions include at least one of a lighting direction, an orientation of the object, a viewing direction, a viewing distance, and a distance between the object and lighting.

3. The apparatus according to claim 1, wherein, in a case where the target data has no material appearance information of the object, the control unit displays a still image corresponding to the target data on the display unit.

4. The apparatus according to claim 1, wherein the one or more processors further function as a generation unit configured to generate moving image data or still image data based on a result of the determination by the determination unit, wherein the control unit displays an image represented by the generated moving image data or the generated still image data.

5. The apparatus according to claim 4, wherein the generating unit uses any one of bump mapping, ray tracing, and photon mapping.

6. The apparatus according to claim 1, wherein the one or more processors further function as a setting unit configured to set a way of changing a viewing condition at a time of displaying a moving image corresponding to the target data, wherein the control unit displays the moving image corresponding to the target data based on the set way of changing the viewing condition.

7. The apparatus according to claim 6,
wherein the acquisition unit acquires a plurality of pieces of the target data, and
wherein, in a case where the control unit displays the moving image corresponding to the respective pieces of target data, the setting unit differentiates the way of changing the viewing condition among a plurality of the moving images.

8. The apparatus according to claim 6,
wherein the acquisition unit acquires a plurality of pieces of the target data, and
wherein, in a case where the display control unit displays the moving image corresponding to the respective pieces of target data, the setting unit equalizes the way of changing the viewing condition among a plurality of the moving images.

9. The apparatus according to claim 6, wherein, in a case where the control unit displays a plurality of moving images corresponding to one piece of the target data, the setting unit differentiates the way of changing the viewing condition among the plurality of moving images.

10. The apparatus according to claim 6, wherein the setting unit sets the way of changing the viewing condition along a time axis based on a user's instruction.

11. The apparatus according to claim 1, wherein, in a case of displaying a plurality of moving images corresponding to the target data on the display unit, the control unit synchronizes a reproduction start frame and a frame rate among the plurality of moving images.

12. The apparatus according to claim 1, wherein the determination unit performs the determination based on binary data indicating whether the target data has the material appearance information of the object.

13. An apparatus, comprising:
one or more processors; and
at least one memory coupled to the one or more processors storing instructions that, when executed by the one or more processors, cause the one or more processors to function as:
an acquisition unit configured to acquire first data having material appearance information of an object and second data having no material appearance information of an object; and
a control unit configured to display, on a display unit, a moving image, which includes a plurality of frames under different viewing conditions, corresponding to the first data together with a still image corresponding to the second data.

14. A method comprising:
acquiring target data;
determining whether the target data has material appearance information of an object; and
performing control for displaying, on a display unit, an image corresponding to the target data based on a result of the determination,
wherein, in a case where the target data has the material appearance information of the object, the performing control displays a moving image or consecutive still images, which includes a plurality of images under different viewing conditions, corresponding to the target data.

15. The method according to claim 14, wherein the viewing conditions include at least one of a lighting direction, an orientation of the object, a viewing direction, a viewing distance, and a distance between the object and lighting.

16. The method according to claim 14, further comprising generating moving image data or still image data based on a result of the determination by the determining, wherein the performing control displays an image represented by the generated moving image data or the generated still image data.

17. A non-transitory computer-readable storage medium storing instructions that, when executed by a computer, cause the computer to perform a method, the method comprising:
acquiring target data;
determining whether the target data has material appearance information of an object; and
performing control for displaying, on a display unit, an image corresponding to the target data based on a result of the determination,
wherein, in a case where the target data has the material appearance information of the object, the performing control displays a moving image or consecutive still images, which includes a plurality of images under different viewing conditions, corresponding to the target data.

18. The non-transitory computer-readable storage medium according to claim 17, wherein the viewing conditions include at least one of a lighting direction, an orientation of the object, a viewing direction, a viewing distance, and a distance between the object and lighting.

19. The non-transitory computer-readable storage medium according to claim 17, further comprising generating moving image data or still image data based on a result of the determination by the determining, wherein the performing control displays an image represented by the generated moving image data or the generated still image data.

* * * * *